June 24, 1969 R. W. STAHLHUT 3,452,199

DETECTION AND UTILIZATION OF HEAT AND INFRARED RADIATION EMITTED BY MAGNETIC ELEMENTS DURING MAGNETIC REVERSAL THEREOF

Filed May 3, 1966

INVENTOR
R. W. STAHLHUT
BY Lucian C. Canepa
ATTORNEY

June 24, 1969 R. W. STAHLHUT 3,452,199

DETECTION AND UTILIZATION OF HEAT AND INFRARED RADIATION EMITTED BY MAGNETIC ELEMENTS DURING MAGNETIC REVERSAL THEREOF

Filed May 3, 1966

United States Patent Office 3,452,199

Patented June 24, 1969

3,452,199

DETECTION AND UTILIZATION OF HEAT AND INFRARED RADIATION EMITTED BY MAGNETIC ELEMENTS DURING MAGNETIC REVERSAL THEREOF

Richard W. Stahlhut, Jackson, N.J., assignor to Bell Telephone Laboratories, Incorporated, New York, N.Y., a corporation of New York Filed May 3, 1966, Ser. No. 547,262

Int. Cl. G01t *1/16*

U.S. Cl. 250—83.3 8 Claims

ABSTRACT OF THE DISCLOSURE

A detecting arrangement is associated with a magnetic element for sensing the heat and infrared radiation emitted from the element during magnetic reversal and for providing an electrical or visual indication of the reversal.

This invention relates to magnetic elements and more particularly to detecting and utilizing the energy losses that occur in such elements during magnetic reversal thereof.

Energy losses occur in ferri- and ferromagnetic materials during alteration of the magnetization condition of the materials. These losses, which are manifested as heat and infrared radiation, arise mainly from eddy currents, hysteresis effects and domain-wall relaxation and resonance phenomena. Heretofore these losses have been considered undesirable and considerable effort has been directed to the design of magnetic structures in which these losses are minimized.

An object of the present invention is to take advantage of the energy losses that occur in magnetic materials during magnetic reversal thereof. More specifically, an object of this invention is to detect and utilize such losses to provide an indication that magnetic reversal has occurred in the materials.

Another object of the present invention is to provide simple low-cost reliable devices responsive to the energy losses that occur in magnetic materials during magnetic reversal for supplying electrical or visual indications of the condition of the materials.

Briefly stated, these and other objects of the present invention are realized in a specific illustrative embodiment thereof that comprises heat or infrared detecting circuitry associated with a square-loop magnetic core for providing an electrical output signal indicative of the switching of the core. By combining a plurality of such basic embodiments in a coordinate array, a unique switch matrix arrangement is provided.

In an alternative form of the invention, a heat- and infrared-sensitive coating is applied to each of a plurality of magnetic elements arranged in an indicating configuration. By selectively activating energizing windings coupled to the elements, it is feasible to make only certain ones of the elements luminesce. In this way a visual indication of any desired symbol is easily provided.

Accordingly, it is a feature of the present invention that a detecting arrangement be associated with a magnetic element for sensing the energy losses that occur in the element during magnetic reversal thereof and for providing an output indication of the reversal.

It is a further feature of this invention that a heat or infrared detector be combined with a square-loop magnetic core for sensing the switching of the core.

It is a still further feature of the present invention that a heat- and infrared-sensitive coating be applied to a magnetic element, thereby to provide a visual indication of the magnetic condition of the element.

A complete understanding of the present invention and of the above and other objects, features and advantages thereof may be gained from a consideration of the following detailed description of several illustrative embodiments thereof presented hereinbelow in connection with the accompanying drawing, in which.

Figures 1, 2:
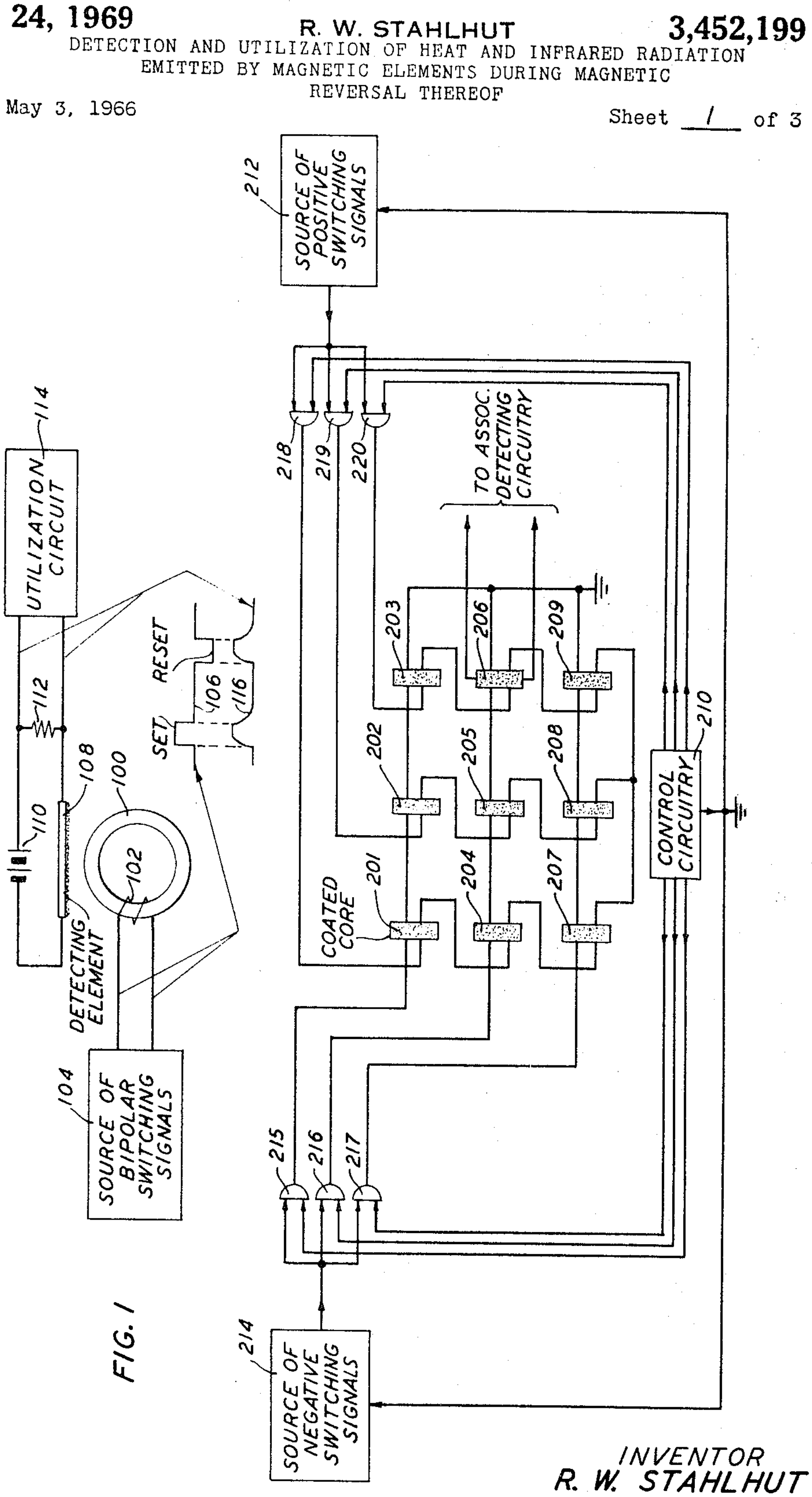
FIG. 1 depicts a specific illustrative embodiment made in accordance with the principles of the present invention.
FIG. 2 shows a switch matrix constructed from basic units of the general type illustrated in FIG. 1.

Referring now to FIG. 1, there is shown a magnetic element 100 having a winding 102 coupled thereto. (For illustrative purposes the element 100 will be considered to be a square-loop magnetic core.) The winding 102 is connected to a source 104 of bipolar switching signals. The nature of the signals supplied by the source 104 to the winding 102 is indicated by a waveform 106 that includes so-called set and reset portions.

Disposed in close proximity to the core 100 of FIG. 1 is a detecting element 108 for sensing energy losses that occur during switching of the core 100. The element 108 may, for example, be a thermal detector such as a conventional thermocouple, thermopile, thermistor, bolometer or Golay pneumatic detector. Thermal-type detectors are, however, generally characterized by relatively low detectivities and slow response times in comparison with known infrared detectors. For this reason the element 108 is advantageously chosen to be an infrared detector of the photoconductive, photovoltaic or photoelectromagnetic type. Illustratively, the element 108 will be considered to be a photoconductive detector made of lead sulfide. The ohmic resistance of such a detector changes (decreases) in response to infrared radiation directed thereat.

The detecting element 108 shown in FIG. 1 is connected in series with a battery 110 and a load resistor 112. In turn, a utilization circuit 114 is connected across the resistor 112. When a burst of infrared radiation impinges upon the detecting element 108, the resistance of the element 108 changes, whereby a pulse-type signal appears across the resistor 112 and is applied to the utilization circuit 114.

Assume that the magnetic element 100 of FIG. 1 is initially in its reset or maximum negative remanent magnetization state. A subsequent set signal from the source 104 is effective to switch the element 100 to its maximum positive remanent magnetization state. Energy losses, including infrared radiation, occur during this switching process. As a result, the resistance of the element 108 decreases and a positive pulse (shown in a waveform 116) is applied to the utilization circuit 114 in approximate time coincidence with the aforenoted set signal. Subsequently, a reset signal (see the waveform 106) returns the element to its initial state. In response to this switching action, another positive pulse is applied by the infrared detecting circuitry to the circuit 114.

Thus the basic arrangement shown in FIG. 1 is effective to supply output pulses indicative of the switching action of the magnetic element 100. The output indication provided by the described detecting circuitry is similar in form to that that would be derived from a conventional sense winding coupled to the element 100. Hence the detecting circuitry is well suited to be associated with a magnetic element in a memory array to provide output signals representative of the storage condition of the element.

Illustratively, such an array includes a plurality of magnetic elements, each with its respective associated detecting circuitry.

The detecting circuitry of FIG. 1 is electrically decoupled from and independent of the magnetic element 100 and its associated switching circuit. Hence, in contrast to a conventional sense winding utilized to provide output signals, the depicted arrangement does not exhibit the disadvantages of half-select currents and transients and voltage-limited output signals.

It is known that infrared detectors operate in a particularly efficient manner at cryogenic temperatures. Hence it is advantageous that the apparatus sown in FIG. 1 be maintained and operated at such temperatures. However, it is not essential that the depicted apparatus be kept at low temperatures. Room-temperature operation is feasible.

The signal-to-noise ratio of the arrangement shown in FIG. 1 is significantly enhanced if its mode of operation is modified. (Such a modification is especially advantageous for room-temperature operation.) In accordance with the modification, the magnetic condition of an element is successively switched or reversed at a rapid rate. As a result, the energy losses of the element, and hence the amount of infrared radiation emitted therefrom, is significantly increased over that which occurs in response to relatively widely spaced single switching occurrences. In such a modified arrangement, the threshold level of the detecting and utilizion circuitry is advantageously established to discriminate against the relatively small amount of infrared radiation emitted by a magnetic element in undergoing a single magnetic reversal.

The modified mode of operation described above is embodied in the arrangement shown in FIG. 2. In FIG. 2 nine magnetic elements 201 through 209, for example square-loop cores, are positioned in a coordinate array to form a 3-by-3 switch matrix or binary to one-out-of-nine translator. To illustrate another aspect of the principles of the present invention, each of the cores 201 through 209 is indicated as having its associated detecting element coated thereon rather than physically separated therefrom as in FIG. 1. Electrical leads (not shown in FIG. 2 except for the core 206) are affixed to each coating and extend to associating detecting circuitry of the type shown in detail in FIG. 1.

The switch matrix arrangement of FIG. 2 includes control circuitry 210, a source 212 of positive switching signals, a source 214 of negative switching signals and routing gates 215 through 220. At the same time, the circuitry 210 enables one of the gates 215 through 217 and one of the gates 218 through 220. In this way, the positive signals supplied by the source 212 are routed through one 3-element set of vertically disposed cores, and the alternately occurring negative signals supplied by the source 214 are routed through one 3-element set of horizontally disposed cores. One of the cores 201 through 209 is thereby selected. For example, assume that the gates 216 and 220 are enabled by the circuitry 210. As a result, the core 206 is selected, whereby it is repeatedly switched back and forth between its maximum remanent states. In consequence thereof, a significant amount of infrared radiation (and heat) is applied to the detecting element associated with the core 206. By contrast, none of the other or nonselected cores emits sufficient infrared radiation (or heat) to exceed the aforementioned threshold that is characteristic of this modified mode of operation. Accordingly, the switch matrix arrangement of FIG. 2 is effective to supply an output signal to one and only one of the utilization circuits respectively associated with the cores 201 through 209.

Figure 3:
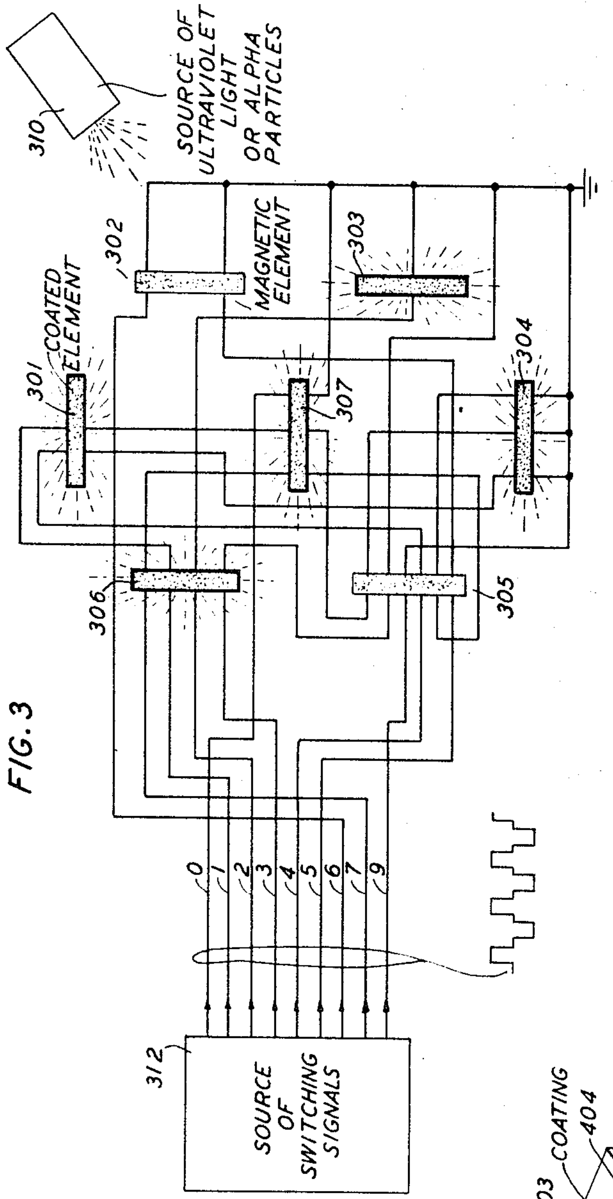
FIG. 3 illustrates a numerical indicator which embodies the principles of this invention.

FIG. 3 shows the arrangement of another embodiment of the principles of the present invention. By way of illustration, the depicted embodiment includes seven magnetic elements 301 through 307 (for example toroidal cores) spatially configured in the form of a figure 8. Each of the elements 301 through 307 is coated with a heat- and infrared-sensitive phosphor such as, for example, zinc-cadmium sulfide, which in response to excitation by ultraviolet light or alpha particles luminesces or glows. Such excitation is supplied by a source 310. Each coating is further characterized by the property that heat and infrared radiation directed thereat are effective to termniate its excitation and thereby quench its luminescence.

It is noted that the elements 301 through 307 of FIG. 3 need not necessarily be coated with a heat- and infrared-sensitive phosphor. If it is more convenient to do so, the phosphor may be physically displaced from its associated magnetic element and placed on a suitable supporting member.

In the presence of radiation supplied by the source 310 and in the absence of bipolar switching signals supplied by a source 312, all seven of the magnetic elements 301 through 307 (FIG. 3) luminesce. Accordingly, a visual indication of the numeral 8 is thereby provided. All the other numerals from 0 through 9 can be indicated by quenching selected ones of the seven elements 301 through 307. Furthermore, it is apparent that any desired symbol (for example the letters of the alphabet) may be visually displayed by arranging a plurality of such elements to define other master patterns.

Quenching of the excited luminescence of one of the coated elements shown in FIG. 3 is effected by rapid reversal of the magnetic condition thereof. This is accomplished, illustratively, by energizing the element with switching signals supplied by the source 312. If the elements 301 through 307 are made of a square-loop magnetic material, the switching signals are bipolar in nature, as exemplified by a waveform 316. However, the material of the elements 301 through 307 need not be of a square-loop type. Any material capable of magnetic reversal may be suitable. Hence each of the elements 301 through 307 may, for example, be made of a conventional linear magnetic material. In the case of a linear magnetic element, a train of unipolar pulses (positive or negative) is effective to reverse the magnetic condition thereof and to cause the occurrence of energy losses of the type on which the principles of the present invention are based.

Assume, however, as indicated in FIG. 3, that the signals supplied by the source 312 are bipolar. Nine leads emanate from the source 312. These leads, which are respectively designated by the digits 0 through 7 and 9, are coupled to the elements 301 through 307 in such a way that energization of any particular one of the leads causes the figure-8-indicating array to luminesce in a pattern representative of the digit designation associated with the particular lead. Thus, for example, energization of the lead 9 causes bipolar switching signals to be coupled to the element 305. In turn, this causes rapid magnetic reversals in this element and consequent heat and infrared radiation therefrom. As described above, this radiation causes the luminescence of the coating material on this element to be quenched. As a result, only the elements 301 through 304, 306 and 307 continue to glow. It is apparent that these glowing elements define the numeral 9.

In a similar way each of the digits 0 through 8 can be formed by the indicating array of FIG. 3. Each of the digits 0 through 7 is formed by energization of a selected one of the eight corresponding leads connected to the source 312. On the other hand, the digit 8 is visually indicated when all seven of the elements 301 through 307 are excited to luminesce and no quenching signals are applied thereto. For illustrative purposes, the elements 302 and 305 in FIG. 3 are shown in light outline to indicate the condition of the array when the lead 5 has switching signals applied thereto. In this last-mentioned case, the luminescence of the elements 302 and 305 is extinguished, while the remaining elements 301, 303, 304, 306 and 307 continue to glow, thereby forming the numeral 5.

Figure 4:
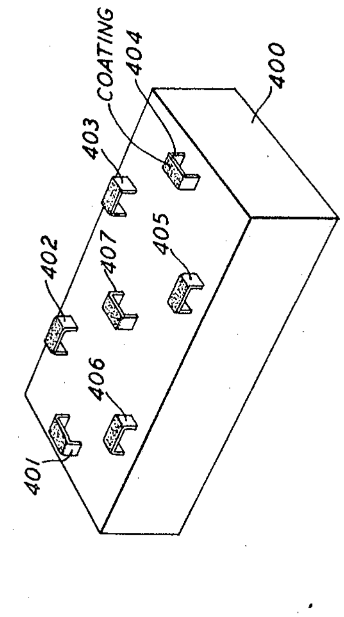
FIG. 4 shows an illustrative structural arrangement for the indicator of FIG. 3.

FIG. 4 illustrates a specific illustrative composite structure that is adapted to constitute a numerical indicator of the general type described above in connection with FIG. 3. Advantageously, the structure of FIG. 4 is molded or otherwise formed from a single piece of magnetic material. The structure includes a base member 400 and seven magnetic elements 401 through 407 integrally formed therewith and arranged in a figure-8-configuration. Each such element is coated with a suitable heat- and infrared-sensitive material of the type described above. By threading energizing wires through the elements 401 through 407 in accordance with the pattern shown in FIG. 3, an indicator for visually presenting the digits 0 through 9, is provided.

Figure 5:
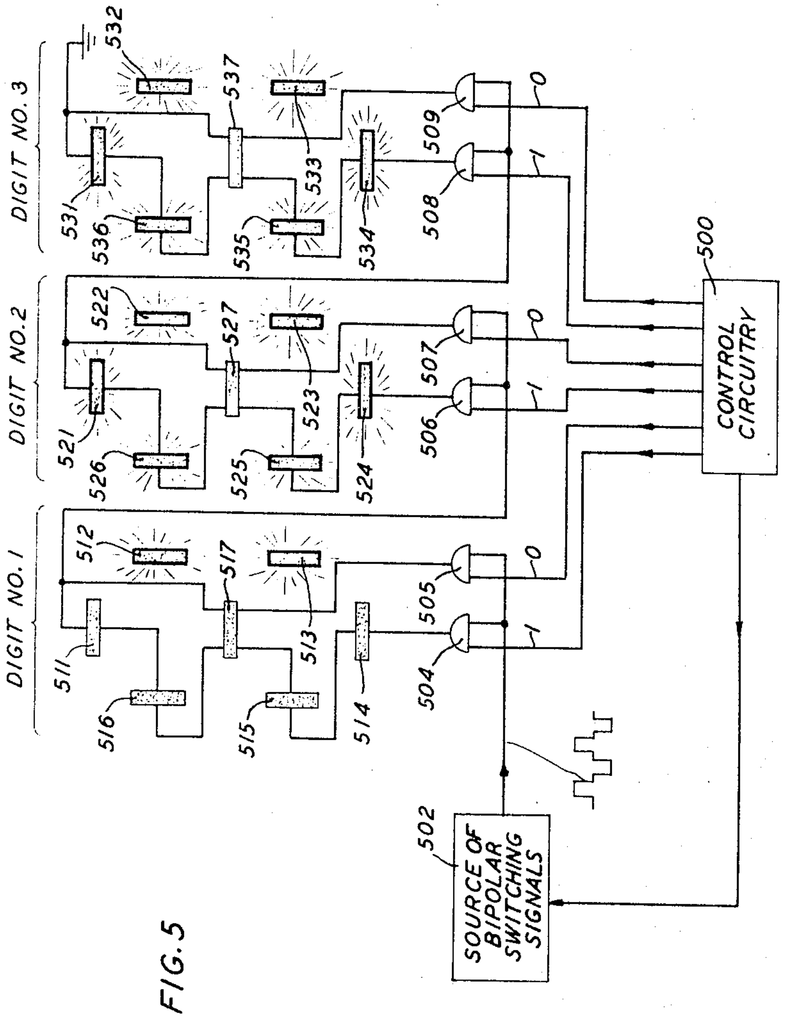
FIG. 5 depicts a 3-digit indicator constructed from basic units of the general type shown in FIG. 3.

A plurality of numerical display units of the type described above may be combined in an array to form a multidigit numerical indicator. A typical 3-digit binary indicator is shown in FIG. 5. The indicator of FIG. 5 includes control circuitry 500, a source 502 of bipolar switching signals and routing gates 504 through 509. In turn, energizing windings connected to the respective outputs of the gates 504 through 509 are coupled to selected ones of three sets of coated magnetic elements. The left-hand such set comprises elements 511 through 517. The middle set includes elements 521 through 527, and the right-hand set comprises elements 531 through 537. Each set of magnetic elements defines one digit position of the 3-digit indicator. Illustratively, the depicted magnetic elements comprise toroidal cores.

As in FIG. 3, the FIG. 5 arrangement can include a source (not shown) of ultraviolet light or alpha particles to activate the coatings on the depicted magnetic elements. Alternatively, each coating may comprise a phosphor combined with a radioactive substance. Such combinations, which are well known in the art, will, in the absence of heat and infrared radiation directed thereat, glow continuously. However, whenever heat or infrared energy is applied thereto, the glow is extinguished.

In operation, the control circuitry 500 of FIG. 5 enables one of the pair of gates 504 and 505, one of the pair of gates 506 and 507 and one of the pair of gates 508 and 509. In this way, bipolar switching signals from the source 502 are routed through selected ones of the depicted elements. The wiring pattern of the energizing leads emanating from the gates 504 through 509 is such that whenever the left-hand one of a pair of routing gates is enabled, the numeral 1 is displayed in a luminescent pattern by the associated magnetic elements. Whenever the right-hand one of a pair of gates is enabled, the numeral 0 is displayed by the associated elements.

For illustrative purposes, assume that the gates 504, 507 and 509 are enabled by the circuitry 500 of FIG. 5. Such enablement can be considered to be representative of the binary number 100 being supplied by the circuitry 500. In response thereto and to switching signals from the source 502, the digits 1, 0 and 0 are displayed by the luminescent elements 512 and 513, 521 through 526, and 531 through 536, respectively. This particular display is represented in FIG. 5.

By threading additional wires through the magnetic elements of FIG. 5 (in accordance with the wiring pattern illustrated in FIG. 3) the depicted 3-digit binary indicator may be easily converted to a 3-digit decimal indicator.

It is, of course, apparent that appropriate heat sinks or infrared shields may be combined with the various embodiments described herein to minimize interaction effects between adjacent magnetic elements. Additionally, the described indicators may if desired be positioned in appropriate housings to create a semidark environment in which the herein-considered luminescent phenomena are particularly visible.

Finally it is to be understood that the above-described arrangements are only illustrative of the application of the principles of the present invention. In accordance with these principles, numerous other arrangements may be devised by those skilled in the art without departing from the spirit and scope of the invention. For example, ferrite sheet arrangements embodying the principles of this invention may be constructed. Also, various alternative types of phosphors are available for utilization in embodiments of the invention. Such alternative types include those that are excited (rather than quenched) in response to heat or infrared radiation.

What is claimed is:

1. A switch array comprising a plurality of combinations arranged in a coordinate matrix configuration, each of said combinations comprising: a square-loop magnetic core, means for switching said core between its maximum remanent magnetization conditions thereby to cause infrared radiation to be emitted therefrom, and means, including an infrared-sensitive detecting film coated on said core, responsive to the receipt of said emitted radiation for providing an indication that the magnetic condition of said core has been switched; and control means connected to said switching means for selecting a single one of said cores to be repeatedly switched, whereby said selected core radiates a significant amount of infrared radiation that is above a threshold level characteristic of said array.

2. In combination, a magnetic member, means coupled to said member for altering the magnetic condition thereof thereby to cause radiation to be emitted from said member, and means including a phosphor element associated with said member and responsive to the receipt of said emitted radiation for providing an indication that the magnetic condition of said member has been altered.

3. A combination as in claim 2 wherein said phosphor element is of the quenchable type and comprises a film coated on said member, and wherein said combination further includes means for exciting said phosphor element to cause it to luminesce in the absence of the receipt of radiation.

4. A combination as in claim 3 wherein said exciting means comprises a source of ultraviolet light positioned in spaced relationship with respect to said member.

5. A combination as in claim 3 wherein said exciting means comprises a source of alpha particles positioned in spaced relationship with respect to said member.

6. A combination as in claim 3 wherein said phosphor element includes a radioactive substance combined therewith for exciting said element and causing luminescence thereof.

7. An indicator array comprising a plurality of combinations each as defined in claim 2 arranged in a master pattern configuration definitive of multiple symbols, means connected to said altering means for controlling which ones of said members are to have their magnetic conditions altered thereby to select which ones of said phosphor elements are to luminesce and which particular symbol of said master pattern is to be visually displayed.

8. An integral block of magnetic material formed to comprise a base portion and a plurality of indicating portions arranged in a multisymbol master pattern configuration, a phosphor element coated on each of said indicating portions, and means for altering the magnetic condition of selected ones of said indicating portions.

References Cited

UNITED STATES PATENTS

| | | | |
|---|---|---|---|
| 2,181,274 | 11/1939 | Jackson et al. | 336—177 |
| 2,965,883 | 12/1960 | Miller. | |
| 2,995,660 | 8/1961 | Lempicki. | |
| 3,213,441 | 10/1965 | Shook | 340—336 |

RALPH G. NILSON, *Primary Examiner.*

MORTON J. FROME, *Assistant Examiner.*

U.S. Cl. X.R.

250—71; 324—34; 340—173, 174, 324, 336, 378